(12) United States Patent
Sung et al.

(10) Patent No.: US 7,454,633 B2
(45) Date of Patent: Nov. 18, 2008

(54) INTEGRATED CIRCUIT CARD FOR REDUCING POWER CONSUMPTION

(75) Inventors: Hyuk-Jun Sung, Yongin-si (KR); Ki-Yeol Kim, Gunpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 512 days.

(21) Appl. No.: 11/204,814

(22) Filed: Aug. 16, 2005

(65) Prior Publication Data

US 2006/0085655 A1    Apr. 20, 2006

(30) Foreign Application Priority Data

Oct. 20, 2004    (KR)    ........................ 10-2004-0084058

(51) Int. Cl.
*G06F 1/00*      (2006.01)
*G06F 1/26*      (2006.01)
*G06K 5/00*      (2006.01)
*G06K 19/06*     (2006.01)

(52) U.S. Cl. ....................... 713/300; 713/320; 713/324; 235/380; 235/492

(58) Field of Classification Search .................. 713/300
See application file for complete search history.

(56) References Cited

U.S. PATENT DOCUMENTS 5,129,091 A * 7/1992 Yorimoto et al. ............ 713/323

5,212,373 A * 5/1993 Fujioka et al. ............... 235/492
6,264,108 B1 * 7/2001 Baentsch ...................... 235/487
2003/0024985 A1   2/2003 Reis ............................ 235/451

FOREIGN PATENT DOCUMENTS

| JP | 11-224317 | 8/1999 |
| KR | 1998-081575 | 11/1998 |
| KR | 2004-0050748 | 6/2004 |

OTHER PUBLICATIONS

Finkenzeller, Klaus "RFID-Handbuch, Kapitel 10:Architektur Electronicscher Datentrager" Sep. 26, 2002, Carl Hanser Verlag, Munchen Wein, XP002359968 (pp. 281-317, 305-307).
Rankl, Wolfgang, et al., "Handbuch Der Chipkarten; Kapitel 8: Sicherheit Der Chipkarte" Aug. 29, 2002, Carl Hanser Verlag, Munchen Wien, XP002359699 (pp. 521-575).
European Search Report dated Jan. 16, 2006 (citing above references with relevance).

* cited by examiner

*Primary Examiner*—Rehana Perveen
*Assistant Examiner*—Stefan Stoynov
(74) *Attorney, Agent, or Firm*—F. Chau & Associates

(57) ABSTRACT

An integrated circuit card includes an interface block for performing an interface function with the external devices and a power controller for controlling power of a security integrated circuit for detecting if an operational environment is in an abnormal state, the power controller periodically and selectively applies power to the security integrated circuit. Thus, power consumption is reduced in the integrated circuit card; and a stable operation of the integrated circuit card which contactlessly communicates with the external devices can be secured with an extended communication distance.

21 Claims, 10 Drawing Sheets

ASK 100%
Modified Miller, 106kbit/s

Load Modulation
Subcarrier f/16
OOK
Manchester, 106kbit/s

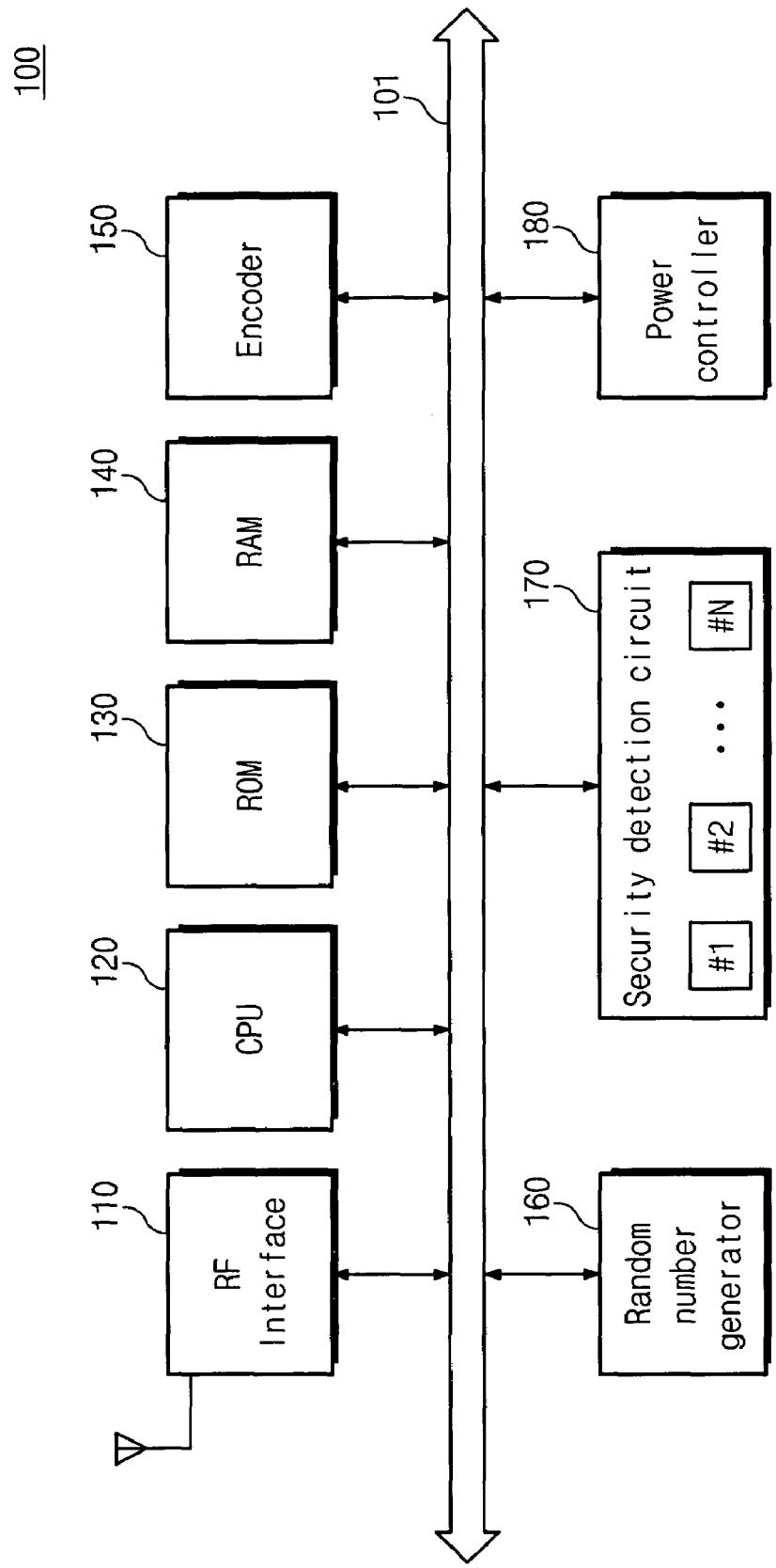

Fig. 4

| | Communication interval | Non-communication interval |
|---|---|---|
| Normal state | Circuit blocks related to communication (RF Interface, RAM) | Circuit blocks related to data processing |
| Standby state | Circuit blocks requiring no operations (CPU, Encoder, Random number generator) | — |
| Power saving state | Circuit blocks requiring operations (Security detectors) | Circuit blocks requiring operations (Security detectors) |

INTEGRATED CIRCUIT CARD FOR REDUCING POWER CONSUMPTION

CROSS-REFERENCE TO RELATED APPLICATIONS

This U.S. non-provisional patent application claims priority under 35 U.S.C. § 119 to the Korean Patent Application 2004-84058 filed on Oct. 20, 2004, the entire contents of which are hereby incorporated by reference.

TECHNICAL FIELD

The present invention relates to an integrated circuit card, more particularly, to an integrated circuit card that communicates with the external devices.

DESCRIPTION OF THE RELATED ART

Since credit cards appeared first in 1920s, various kinds of cards including a cash card, a credit card, an identification card, a security card and a department store credit card have been used. Recently, an integrated circuit IC card, also called a minimized computer, has drawn attention because of its convenience, stability or versatility.

An IC card is a credit card-sized plastic card to which a thin semiconductor device is attached. Typically, an IC card provides a higher level of security than a conventional magnetic striped card and does not readily lose stored data. The IC card is generally a plastic card having the same thickness and size as a conventional magnetic card or as a credit card formed in a type of a Chip-On-Board (COB) with a thickness of about 0.5 mm.

The IC cards are divided into contact IC cards and contactless IC cards. The contactless IC cards are further divided into Contactless IC Cards (CICC) and Remote Coupling Communication Cards (RCCC). For the CICC, a communication range is from 0 to 2 mm at a carrier frequency of 4.9157 MHz. For the RCCC, a communication range is from 0 to 10 cm, at a carrier frequency of 13.56 MHz.

The contactless cards specified in accordance with the International Organization for Standardization (ISO) and the International Electrotechnical Commission (IEC). For example, the ISO/IEC 10536 specifies CICC, and ISO/IEC 14443 specifies certain mechanical characteristics of RCCC and protocols on a wireless frequency power, signal interface, initialization procedure and collision prevention techniques, etc. According to the ISO/IEC 14443, the contactless IC card includes an Integrated Circuit (IC) for carrying out processing and/or memory functions. The contactless IC card does not use a galvanic element and is provided with interchanges of a signal and power by an inductive coupling with a proximity coupling device or a card reader. The card reader connected with the contactless IC card generates an energy field using Radio Frequency (RF) field and transfers power to the contactless IC card.

FIGS. 1A and 1B illustrate an example of a communication signal for an A-type interface according to the ISO/IEC 14443. A signal illustrated in FIG. 1A shows a signal transmitted to the contactless IC card from a card reader, and FIG. 1B shows a signal transmitted to the card reader from the contactless IC card. Two kinds of communication signal contacts (A-type or B-type) are described in ISO/EEC 14443. Communications from a card reader to a contactless IC card according to the A-type of ISO/IEC standard adopts an Amplitude Shift Keying (ASK) 100% modulation method and a modified Miller Code method. A signal transmitted from the card reader to the contactless IC card has a bit rate or a data rate of fc/128, i.e., 106 kbps. The transmitted signal from the contactless IC card to the card reader is coded in a Manchester code and demodulated in an On-Off Key (OOK) method. For example, in the subways or buses in Seoul, Korea, the cards using the A-type communication signal contact method generate a timing at a regular time interval from an ASK modulation signal received from the card reader and process data sending/receiving bit by bit.

FIG. 2 shows a pause interval of data transmitted to an IC card from a card reader in at least one embodiment of the invention. When data is transmitted from an IC card to a card reader, power supplied from the card reader is stably coupled to the IC card. When data is transmitted from the card reader to the IC card, as shown in FIG. 2, a "pause" t2 interval is included. Hence, there exists a duration of frame wherein a power supplied from the card reader to the IC card is temporarily halted.

SUMMARY OF THE INVENTION

In an embodiment of the present invention, an integrated circuit card is provided which comprises an interface block performing an interface function to the external devices; a function block performing other functions except the interface function; and a power controller controlling powers of the interface block and the function block, the power controller periodically applies power from being supplied to the function block in a selective manner.

Preferably, the function block includes a security detection circuit for detecting if an operational environment of the integrated circuit card is in an abnormal state. The security detection circuit includes a plurality of detectors. The power controller selectively applies power from being periodically supplied to the plurality of detectors preferably in a sequential manner.

In one embodiment, the integrated circuit card further comprises a data processing block for processing data transmitted through the interface block. The power controller selectively applies power from being supplied to the data processing block in a communication interval with external devices.

In another embodiment, the power controller applies power periodically and selectively to non-operational circuit blocks out of the interface block and the plurality of circuit blocks during the non-communication interval with the external device.

In a preferred embodiment, the integrated circuit card is a proximity contactless integrated circuit card.

An integrated circuit card according to another feature of the present invention comprises: an interface block performing an interface function with the external devices; a data processing block processing data transmitted through the interface block; a security detection circuit detecting if an operational environment of the integrated circuit card is in an abnormal state; and a power controller controlling powers of the interface block, the data processing block and the security detection circuit, the power controller periodically supplying a power to the security detection circuit.

In a preferred embodiment, the security detection circuit includes a plurality of detectors. The power controller selectively applies power to one of the plurality of detectors preferably in a sequential manner.

In a preferred embodiment, the power controller supplies power to a detector selected out of the plurality of detectors. The power controller then selectively applies power to the selected detector if an enable time passes.

In a preferred embodiment, the power controller supplies a power to the next detector if a guard time passes since a power supply is selectively applied to the selected detector.

In a preferred embodiment, the power controller includes a counter for counting the enable time and the guard time.

In a preferred embodiment, the power controller selectively applies power to the data processing block when the interface block communicates with external devices. The communication interval is an interval receiving the data from the external device.

In a preferred embodiment, the integrated circuit card is a proximity contactless integrated circuit card.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 3 is a view illustrating a circuit configuration of a smart card in accordance with a preferred embodiment of the present invention;

FIG. 4 is a view illustrating a power control of the circuits equipped in the smart card by the power controller at a communication/non-communication interval in accordance with a preferred embodiment of the present invention shown in FIG. 3;

DETAILED DESCRIPTION OF PREFERRED EMBODIMENTS

Figure 1A:
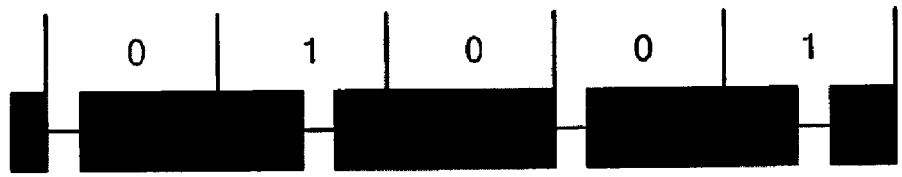
FIGS. 1A and 1B are views illustrating an example of a communication signal for the A-type interface of ISO/IEC 14443.
Figure 1B:
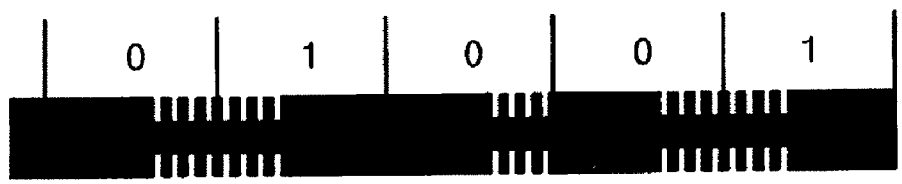
Figure 2:
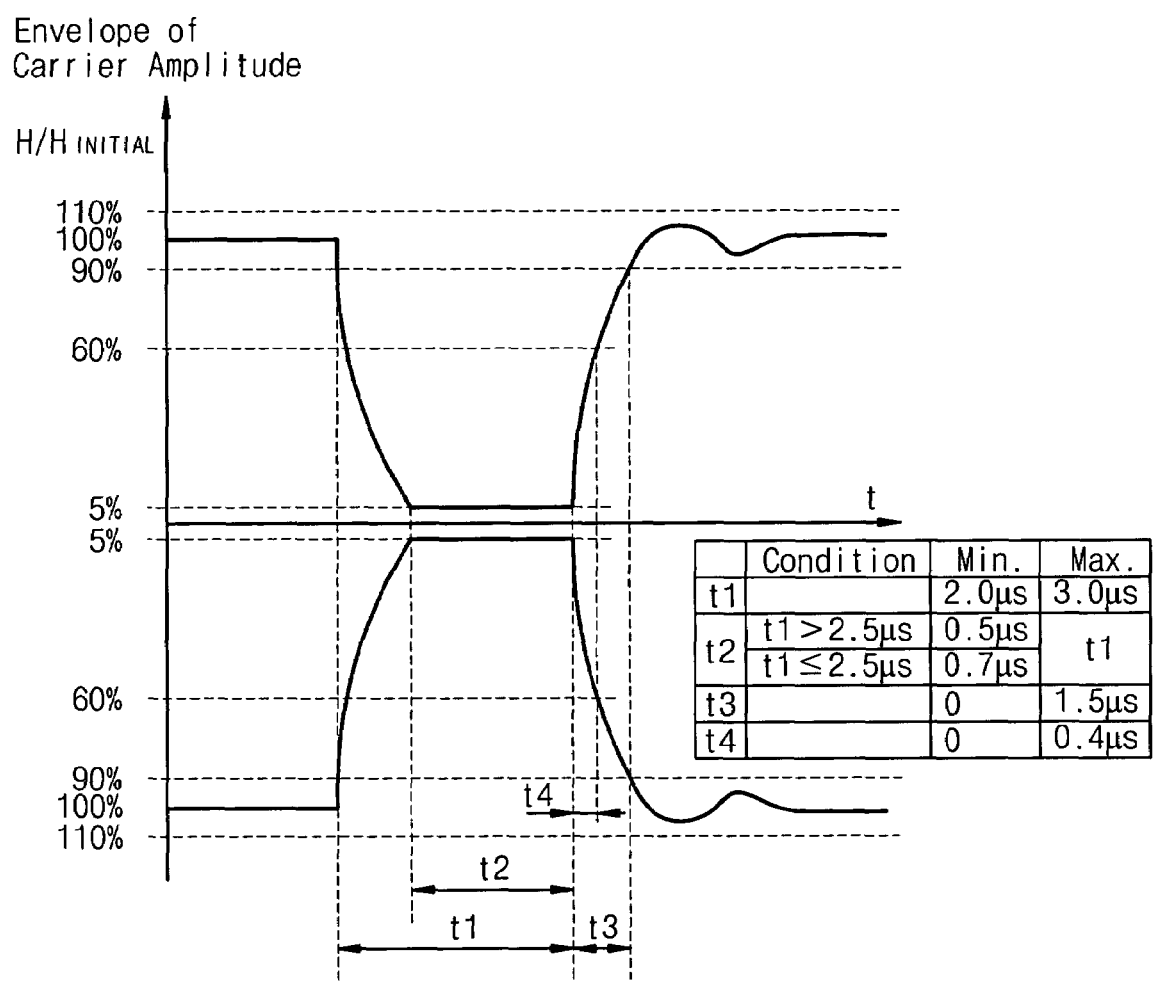
FIG. 2 is a view illustrating a pause interval of data transmitted to an IC card from a card reader.

Preferred embodiments of the present invention will be described with reference to the appended drawings.

In various embodiments of the invention, smart card or a plastic card with a credit card size having an integrated circuit chip with a capability of processing specific transactions by equipping the smart card with a microprocessor, a card operating system, a security module, a memory and so on is explained as an example, but the present invention may be applicable to both different types of integrated circuit cards and electronic devices communicating with the external devices.

FIG. 3 is a view showing a circuit configuration of a smart card in accordance with a preferred embodiment of the present invention. A smart card 100 is a proximity type contactless IC card which operates pursuant to ISO/IEC 14443 standard. The smart card 100 includes a RF interface 110 connected to a bus 101, a CPU 120, a ROM 130, a RAM 140, an encoder 150, a random number generator 160, a security detection circuit 170 and a power controller 180. Even if not shown in FIG. 3, the smart card 100 may further include an Electrically Erasable and Programmable Read Only Memory (EEPROM) and a Serial Input/Output (SIO) interface and a clock generator.

FIG. 4 is a view illustrating a power control of the circuits equipped in the smart card by the power controller in a communication/non-communication interval in accordance with an embodiment of the present invention shown in FIG. 3. FIG. 4 illustrates that circuits equipped in the smart card 100 control power through the power controller 180 in a communication/non-communication interval in accordance with a at least one embodiment of the present invention shown in FIG. 3.

As described above, when the smart card 100 receives data from an external device, for example, a card reader, power is unstably supplied to the smart card because of an existence of a pause interval. To secure stable operations of the smart card 100, unnecessary power consumption is minimized in a communication interval in an at least one embodiment of the present invention. As is described below, the communication interval refers to an interval for transmitting and receiving data between the card reader and the smart card 100, but may be defined as an interval for transmitting data from the card reader to the smart card 100 including a pause interval.

Referring to FIGS. 3 and 4, the power controller 180 sets circuit blocks related to a communication in the communication interval, for example RF interface 110 and RAM 140 in a normal state. The power controller 180 sets circuit blocks not requiring operations out of circuit blocks not related to a communication, for example, a CPU 120, a ROM 130, an encoder 150 and a random number generator 160 as a standby state. The encoder 150 includes a number of gates to perform complicated operations, thus a large amount of current is consumed. In addition, the random number generator 160 consumes a large amount of current because it is designed to operate at a very high speed to generate a random number.

The power consumption at the CPU 120, the ROM 130, the encoder 150 and the random number generator 160, which is set in a standby state, approaches to 0, thereby power consumption of the smart card 100 is minimized.

In general, to prevent an unauthorized user from infiltrating, the smart card 100 includes a plurality of security detectors. The security detectors should be set in an operational state as long as a power is supplied to the smart card 100. In a at least one embodiment of the present invention, a power controller 180 disables all the security detectors so as to minimize power consumption in a communication interval and sequentially enables them.

Referring to FIGS. 3 and 4 again, the power controller 180 sets circuit blocks related to the data processes in the non-communication interval in a normal state. For example, if the data received from the external devices and stored in the RAM 140 is encoded and stored in the RAM 140 again, the CPU 120, the RAM 140 and the encoder 150 are set as a normal state. Circuit blocks which should be always in an operational state but do not affect the operations even if they are temporarily disabled such as a security detection circuit 170 are set in a power saving state. The circuit blocks set in a power saving state are preferably enabled in a sequential manner. If the other circuit blocks except the security detection circuits 170 and the circuit blocks required for the current operations are set in a power saving state, the power consumption in the non-communication interval of the smart card 100 is further decreased.

Figure 5:
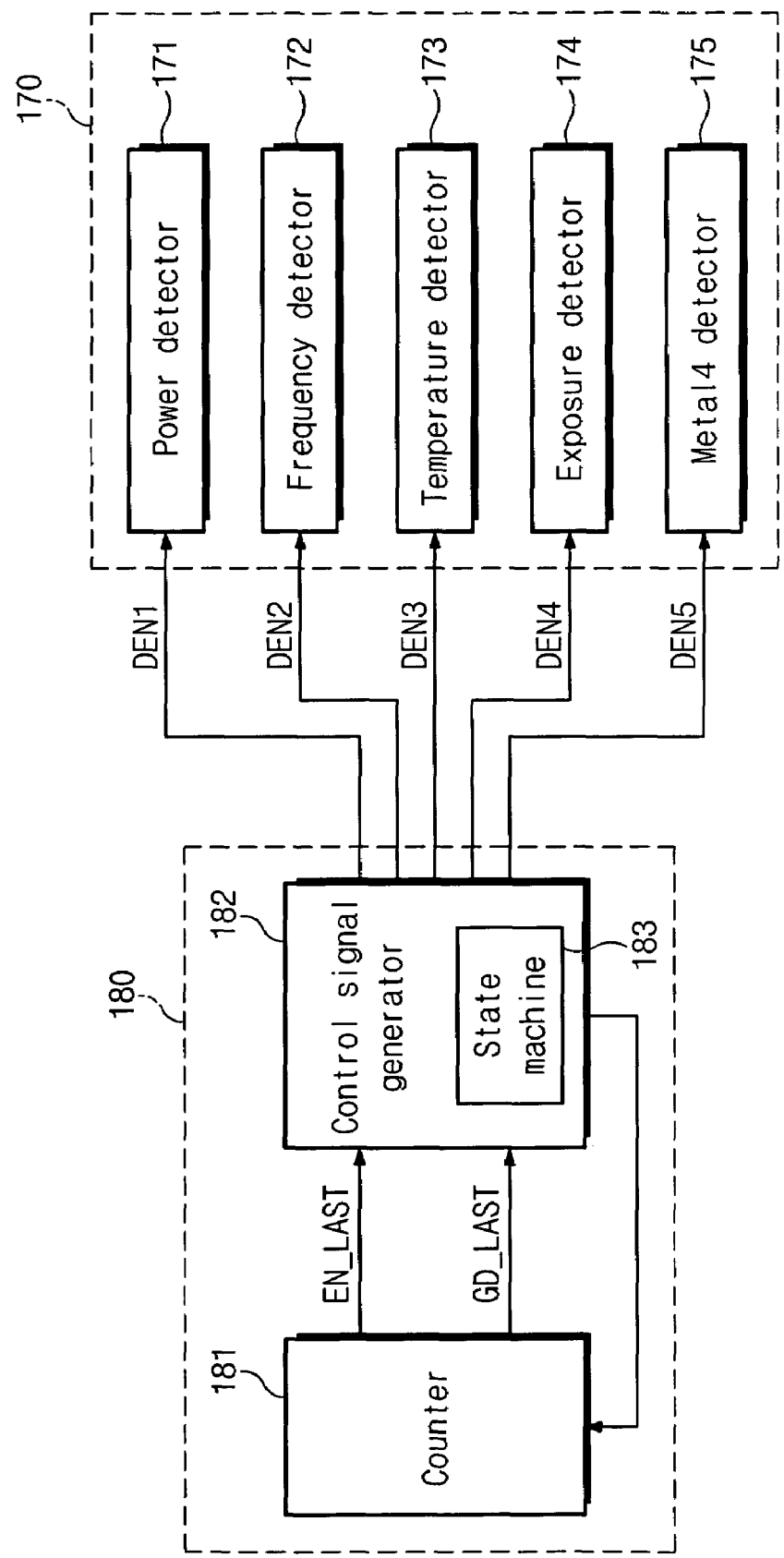
FIG. 5 is a block diagram showing configurations of a power controller and a security detection circuit in accordance with a preferred embodiment of the present invention.

FIG. 5 is a block diagram illustrating configurations of the power controller 180 and the security detection circuit 170 in accordance with a preferred embodiment of the present invention.

Referring to FIG. 5, the security detection circuit 170 includes five detectors 171 to 175. The power detector 171 detects a level of a voltage supplied from the external devices, for example, a card reader, and outputs a detection signal when the detected voltage is not within a regular range. The frequency detector 172 detects a frequency of a main clock signal and outputs a detection signal when the detected frequency is not within a regular range. The temperature detector 173 detects a temperature around the smart card 100 and outputs a detected signal if the detected temperature is higher or lower than a predetermined range of temperature.

The exposure detector 174 outputs a detection signal when a silicon oxide layer used as a protection layer of a chip surface is removed, and the chip is exposed to a light. The metal4 detector 175 outputs a detection signal when an upper metal is a metal4 and is removed. In FIG. 5, only five exemplary detectors 171 to 175 are illustrated, but various detectors for detecting an attack of an intruder or an abnormal state of an operational state can be included in the smart card 100. In addition, the security detection circuit 170 ceases an operation of the smart card 100 when a detection signal is input out of at least one of detectors 171 to 175, and the circuit 170 may further include a controller informing an intrusion by an intruder.

The power controller 180 generates control signals DEN1 to DEN5 to enable or disable the detectors 171 to 175 in the security detection circuit 171 including the counter 181 and the control signal generator 182.

The counter 181 generates pulse signals EN_END and GD_END with a predetermined time interval, and generates control signals so as to control the counter 181 and the detectors 171 to 175.

Figure 6:
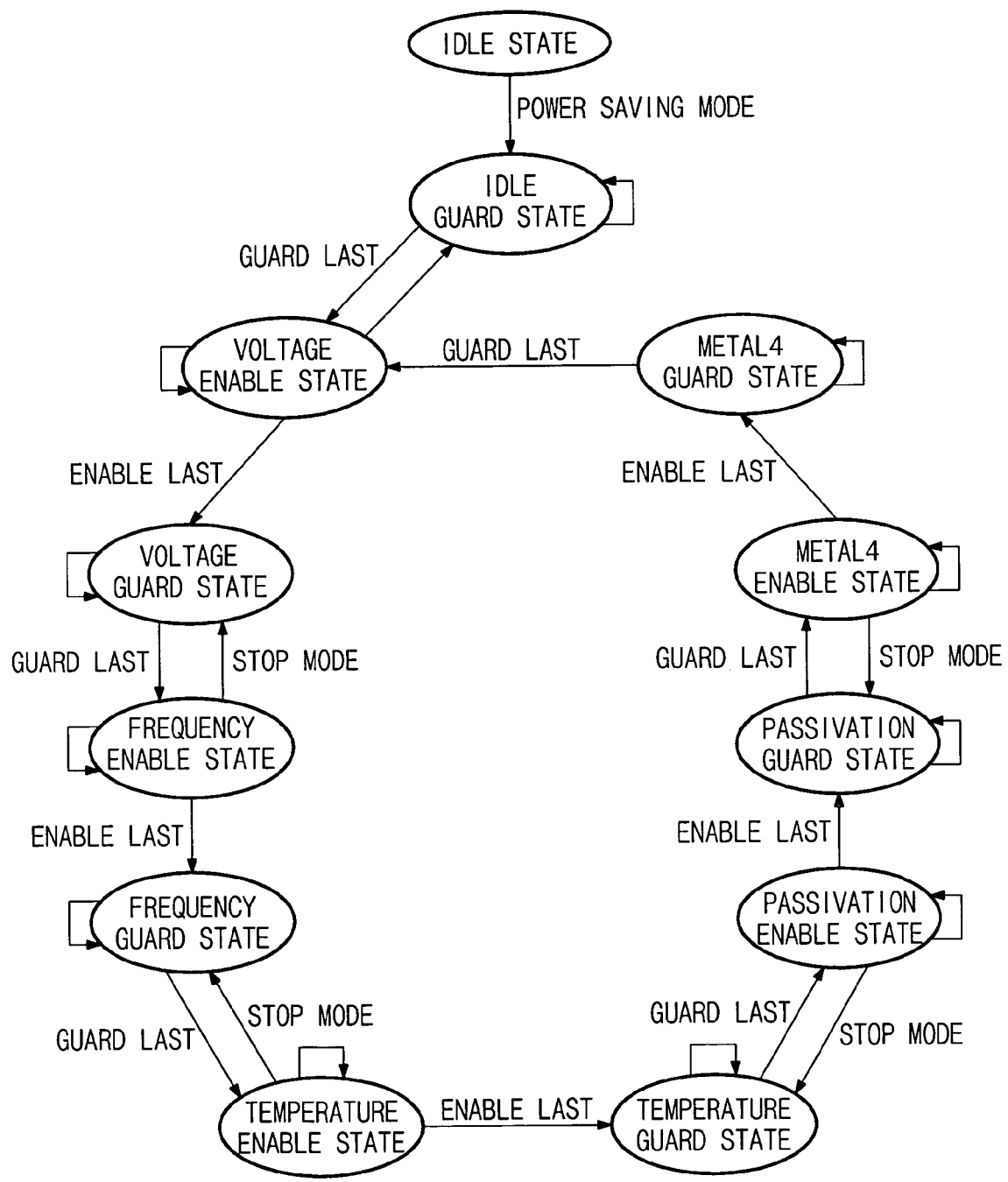
FIG. 6 is a status view of a state machine.
Figure 7:
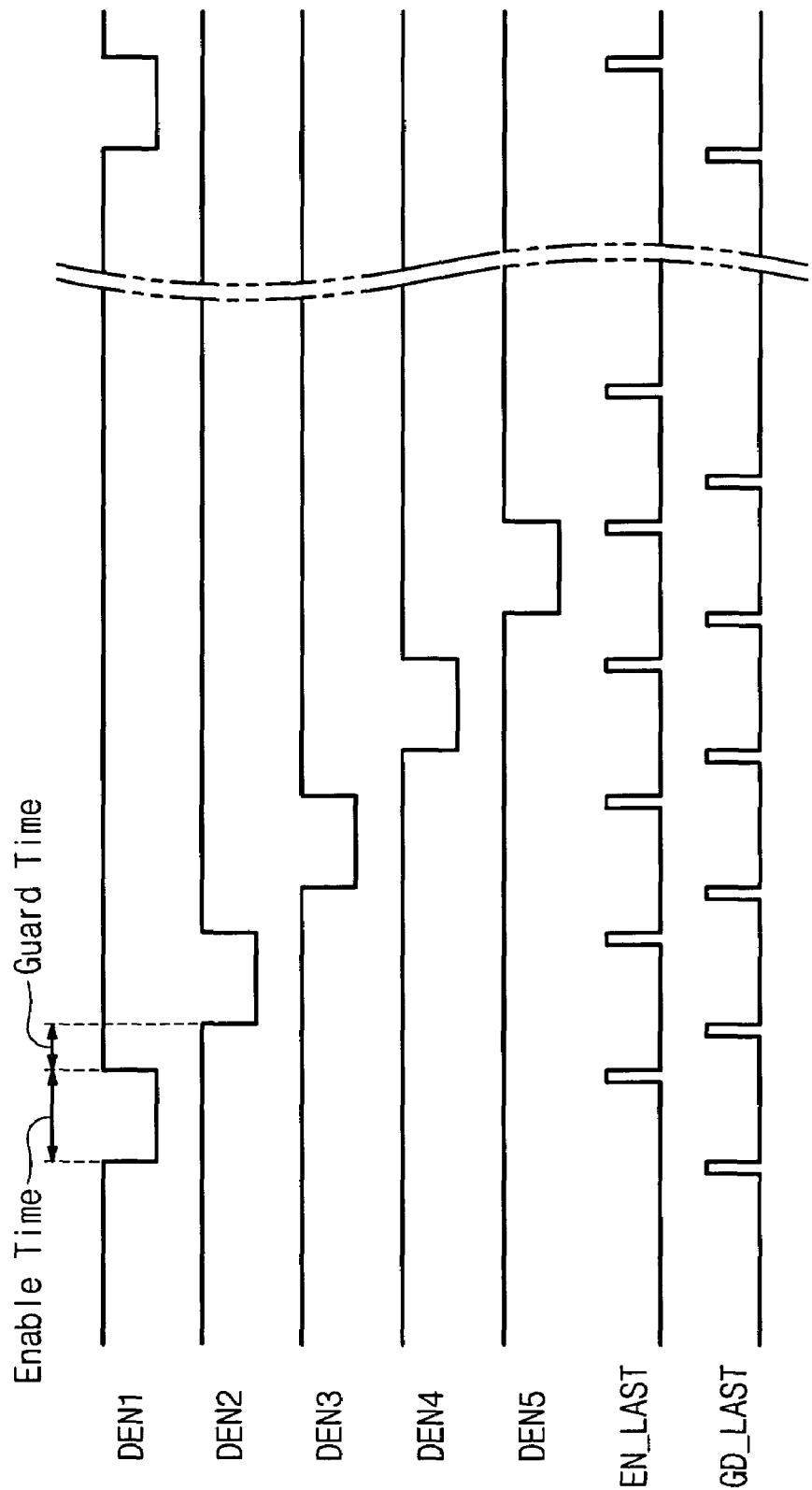
FIGS. 7 and 8 are views showing pulse signals generated from a counter and control signals generated from a control signal generator.
Figure 8:
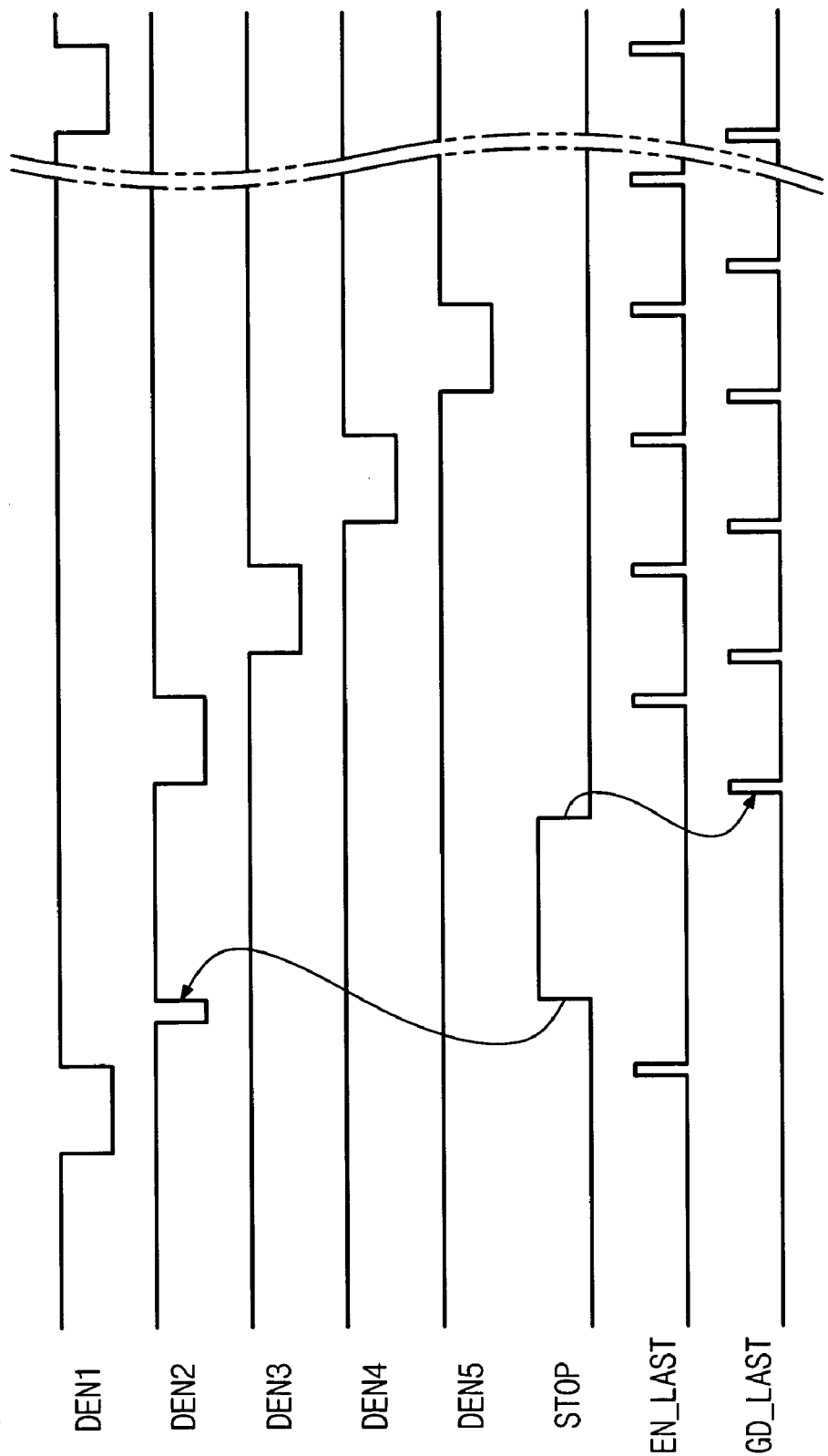

FIG. 6 is a state diagram of a state machine used in accordance with an embodiment of the invention. FIGS. 7 and 8 are timing diagrams showing signals generated from a counter and control signals generated from a control signal generator in at least one embodiment of the invention. The pulse signals generated from the counter 181 and control signals DEN1 to DEN5 generated from the control signal generator 182 are shown in FIGS. 7 and 8.

Referring to FIGS. 5 and 6, if the smart card 100 is reset early, the power controller 180 comes into an idle state. If the smart card 100 is stabilized and enters a power saving mode, the power controller 180 is transformed to an idle guard state. At the idle guard state, the power controller 180 deactivates control signals DEN1 to DEN5 to disable all the detectors 171 to 175. If the power controller 180 informs the counter 181 that it is transformed in a guard state, the counter 181 carries out a counting operation, and outputs a guard end pulse GD_LAST if the guard time passes. Next, a state transformation is completed to carry out a power saving mode.

Initially, the power controller 180 transforms the power detector 171 to an enable state. The control signal DEN1 for enabling a voltage detector 171 is activated, and other control signals DEN2 to DEN5 are deactivated. The counter 181 starts to count in response to a control of the control signal generator 182, and outputs an enable end pulse EN_LAST if an enable time passes. The power controller 180 transforms the power detector 171 from an enable state to a guard state by the enable end pulse EN_LAST. The counter 181 generates a guard end pulse signal GD_LAST if a guard time passes from a point when an enable end pulse signal EN_LAST occurs. The power controller 180 transforms the frequency detector 172 into a guard state by the guard end pulse GD_LAST. In this process, the power controller 180 is repeatedly transformed from an enable state to a guard state with respect to all the detectors 171 to 175. The guard is a protection interval for preventing a temporary voltage rise from occurring when an enable state with respect to a detector is transformed into another enable state with respect to the next detector.

The smart card 100 is thus not directly related to a communication in a communication interval, but sequentially enables circuit blocks which should be in an operational state one by one to minimize power consumption in a communication interval. Thus, stable operations of the smart card cannot be secured in an interval where power supply is unstable.

Furthermore, the state machine 183 of the power controller 180 illustrated in FIG. 6 is repeatedly performed when the smart card 100 is in an operational state, and minimizes power consumption in the detectors 171 to 175 in a non-communication interval as well as a communication interval.

Control signals shown in FIG. 8 are generated from the power controller 180 if the smart card 100 is temporarily set as a stop mode when the power controller 180 performs a power saving mode.

Referring to FIG. 8, when the power controller 180 is in a frequency detector enable state, i.e., when the control signal DEN2 is at an activation state, if a stop mode signal STOP is activated to a high level, the power controller 180 is transformed to a voltage detector guard state to deactivate a control signal DEN2. If the stop mode signal STOP is deactivated into a low level, the power controller 180 is transformed to a frequency detector enable state again.

Figure 9A:
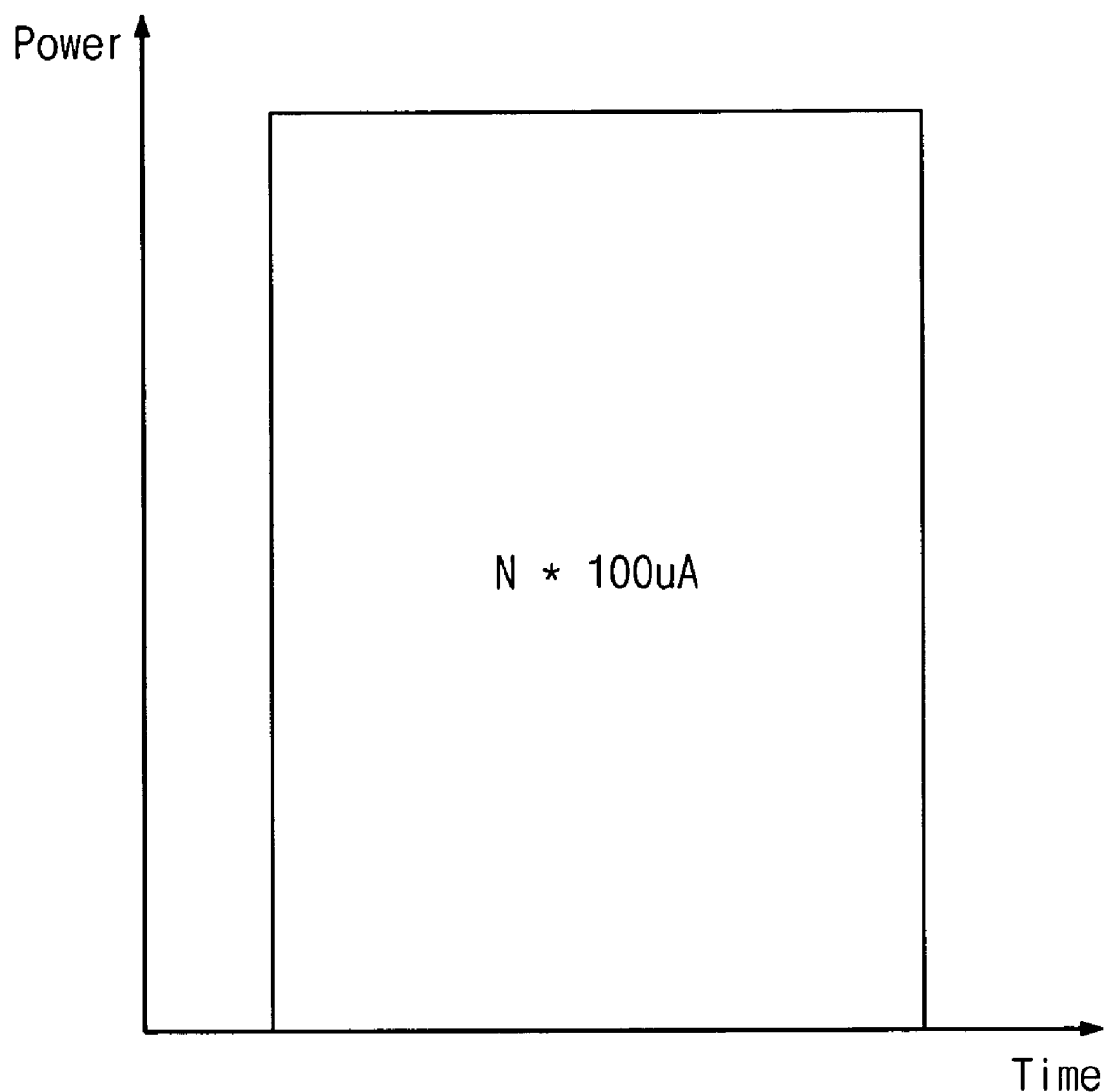
FIGS. 9A and 9B show that power is consumed in N detectors in at least one embodiment of the invention.
Figure 9B:
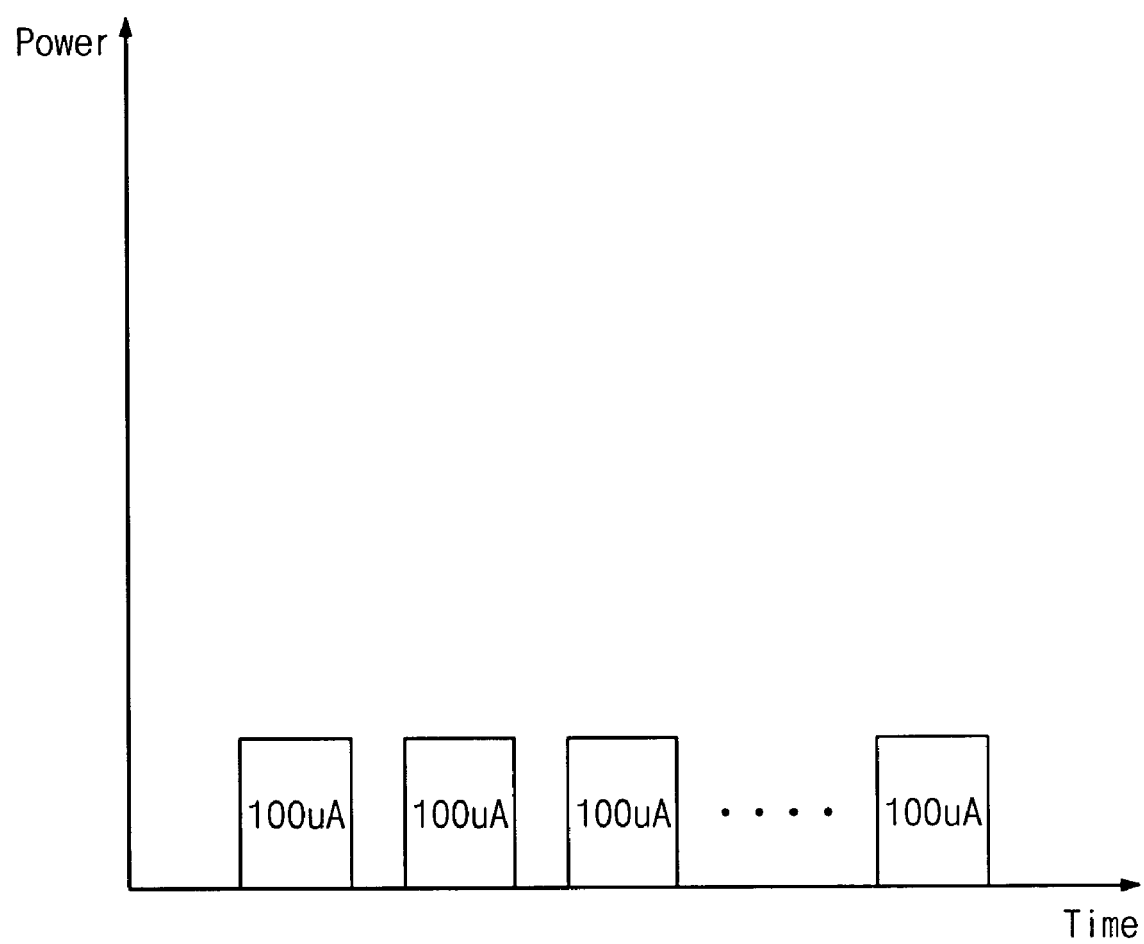

FIGS. 9A and 9B show the power consumption at N detectors in at least one embodiment of the present invention. Assuming that one detector consumes 100 μA power, the power consumption at the detectors is N*100 μA when N detectors are in an enable state as shown in FIG. 9A. However, a smart card in accordance with at least one embodiment of the present invention sequentially enables N detectors, and the maximum power consumption in the detectors at a specific point is 100 μA. Thus, the power consumption can be reduced to 1/N.

In a contactless smart card, the communication range with an external device such as a card reader is inversely proportional to the power consumption of the smart card. Therefore, if power consumption in a smart card is decreased, the communication distance can be increased.

If the above described power saving mode is adapted to the other circuit blocks except circuit blocks directly related to a data process in a non-communication interval as well as in a communication interval, power consumption in the smart card can be decreased.

In an embodiment of the present invention, the power supplied to the detectors in the non-communication interval as well as in the communication interval can be reduced by 1/N, and therefore the power consumption in the smart card is decreased.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An integrated circuit card comprising:
   an interface block performing an interface function to a plurality of external devices;
   a function block performing other functions except the interface function; and a power controller selectively controlling power application to and removal from the interface block and the function block, wherein the function block includes a security detection circuit detecting a state of an operational environment of the integrated circuit card, wherein the security detection circuit includes a plurality of detectors.

2. The integrated circuit card of claim 1, wherein the power controller selectively applies power to the plurality of detectors periodically in a sequential manner.

3. The integrated circuit card of claim 1, further comprising:

a data processing block for processing data communicated through the interface block.

4. The integrated circuit card of claim 3, wherein the power controller selectively controls power from being supplied to the data processing block in a communication interval with the external device.

5. The integrated circuit card of claim 4, wherein the power controller selectively applies power to non-operational circuit blocks out of the interface block and the plurality of circuit blocks in the non-communication interval with the external devices.

6. The integrated circuit card of claim 1, wherein the integrated circuit card is a proximity contactless integrated circuit card.

7. An integrated circuit card comprising:

an interface block performing an interface function with the external devices;

a data processing block processing data transmitted through the interface block;

a security detection circuit detecting if an operational environment of the integrated circuit card is in an abnormal state; and a power controller controlling powers of the interface block, the data processing block and the security detection circuit, wherein the power controller periodically supplies power to the security detection circuit.

8. The integrated circuit card of claim 7, wherein the security detection circuit includes a plurality of detectors.

9. The integrated circuit card of claim 8, wherein the power controller periodically supplies power to one of the plurality of detectors in a sequential manner.

10. The integrated circuit card of claim 9, wherein the power controller supplies power to a selected detector out of the plurality of detectors, and selectively applies power to the selected detector if an enable time lapses.

11. The integrated circuit card of claim 10, wherein the power controller supplies power to the next detector if a guard time passes since a power supply is not supplied to the selected detector.

12. The integrated circuit card of claim 11, wherein the power controller includes a counter for counting the enable time and the guard time.

13. The integrated circuit card of claim 7, wherein the power controller selectively applies power to the data processing block when the interface block communicates with external devices.

14. The integrated circuit card of claim 13, wherein the communication interval is an interval receiving the data from the external device.

15. An integrated circuit card comprising:

a plurality of circuit blocks; and a power controller controlling a group of circuit blocks selected out of other circuit blocks not related to a communication which are comprised in the circuit blocks interacting with the external devices in a communication interval, wherein the power controller sequentially enables the other group of circuit blocks, and disables the enabled circuit block after an enable time passes.

16. The integrated circuit card of claim 15, wherein the group of circuit blocks are circuit blocks which do not operate in the communication interval.

17. The integrated circuit card of claim 15, wherein the other circuit blocks are circuit blocks which do not operate in series.

18. The integrated circuit card of claim 15, wherein the integrated circuit card is a proximity contactless integrated circuit card.

19. The integrated circuit card of claim 15, wherein the circuit blocks related to the communication in a communication interval with the external devices are in an operational state.

20. The integrated circuit card of claim 15, wherein the power controller enables the next circuit block until a guard time passes since the enabled circuit block is disabled.

21. The integrated circuit card of claim 15, wherein the communication interval is an interval for receiving data from the external devices.

* * * * *